US008585859B2

(12) United States Patent
Renius et al.

(10) Patent No.: US 8,585,859 B2

(45) Date of Patent: Nov. 19, 2013

(54) ATTACHMENT MEMBER WITH INTEGRAL ADHESIVE CHANNEL AND METHOD

(75) Inventors: Paul W. Renius, Metamora, MI (US); David T. Renke, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/372,903

(22) Filed: Feb. 14, 2012

(65) Prior Publication Data

US 2013/0206335 A1 Aug. 15, 2013

(51) Int. Cl.
*B29C 65/54* (2006.01)

(52) U.S. Cl.
USPC ......................... 156/305; 156/303.1; 156/295

(58) Field of Classification Search
USPC ........ 156/303.1, 295, 305, 99, 106, 107, 109, 156/261, 263, 293; 264/261, 263
See application file for complete search history.

(56) References Cited

U.S. PATENT DOCUMENTS

| | | | | |
|---|---|---|---|---|
| 4,950,344 | A * | 8/1990 | Glover et al. | 156/109 |
| 5,196,153 | A * | 3/1993 | Kramer | 264/263 |
| 2010/0212828 | A1* | 8/2010 | Buck et al. | 156/305 |

* cited by examiner

*Primary Examiner* — Yogendra Gupta
*Assistant Examiner* — Vishal I Patel
(74) *Attorney, Agent, or Firm* — Quinn Law Group, PLLC

(57) ABSTRACT

An attachment member including an integral adhesive channel and a method of adhering an attachment member to a substrate includes adhering the member to the substrate using a first adhesive attached to the member to form a gap between the substrate and a bonding surface of the member defined by a perimeter edge. The first adhesive may be a pressure sensitive adhesive. The member defines a channel including a first opening configured to receive a second adhesive, which may be a flowable adhesive. The channel includes a second opening in fluid communication with the bonding surface. After adhering the member to the substrate with the first adhesive, the flowable adhesive is dispensed through the channel and into the gap such that the dispensed flowable adhesive is contained in the gap within the perimeter edge of the bonding surface. The flowable adhesive forms a bond between the substrate and the member.

11 Claims, 4 Drawing Sheets

70 44 56 58 62 44 46 62 60 60 44 46 46 62 70 44 56 46 58 62 44 46 60 60 44

50
52
42
46

38
40
44
44
42
52
46
50
38

44
44
9
62
60
64
64
54
48
50
70
44
38
9
44
64
46
42
62
56
64
60
48
70
44
58
38
44
46
42

ATTACHMENT MEMBER WITH INTEGRAL ADHESIVE CHANNEL AND METHOD

TECHNICAL FIELD

The present invention relates to an attachment member attachable to a substrate by an adhesive.

BACKGROUND

Flowable adhesives used to adhere brackets and other attachment members such as glass locating pins to vehicle windshields require autoclaving to cure the flowable adhesive to bond the bracket or pin to the glass surface of the windshield. Autoclaving is a costly process which may affect vehicle assembly productivity by requiring off-line autoclaving of the windshields with associated inventory build-up. The autoclaving process may produce a high variability in bonding strength, and the elevated curing temperature may increase residual stresses in the adhesive bond interface. The member being attached must be held under pressure against the glass surface to wet out the adhesive and during the curing and autoclaving process, which requires clamping, fixturing or otherwise holding the member in contact with the glass surface for an extended period of time. Tape may be used as an assembly aid to hold the member in contact with the glass surface, however adhesive applied to the member prior to locating the member against the glass surface may become contaminated during the adhesive application process, or during wet out of the adhesive, contaminating the tape and compromising the tape adhesive such that the member is not sufficiently held in contact with the glass surface during the curing process. Adhesive squeeze out from the bonding interface may contaminate other surfaces of the member or other components which may come in contact with the squeezed out adhesive, may be detrimental to vehicle appearance, and may require secondary operations to be removed. Structural bonding tape may be substituted in some applications, however structural tape also requires autoclaving to cure the adhesive bond, therefore being disadvantaged by the high costs, reduced productivity and inventory impact of the autoclaving process.

SUMMARY

An attachment member including an integral adhesive channel and a method of adhering a member to a substrate is provided. In one example, the attachment member may be configured as one of a glass locating pin and a bracket, and the substrate may be configured as a glass panel, which may be a windshield of a vehicle. In another example, the attachment member may be configured as a first vehicle component, and the substrate may be defined by a second vehicle component, such that the method may be used to attach the first vehicle component and the second vehicle component to assemble a vehicle.

The method includes, in a first step, adhering the attachment member, which may be referred to herein as the member, to the substrate using a first adhesive attached to the member to form a gap between the substrate and a bonding surface of the member, wherein the bonding surface is defined by a perimeter edge. The first adhesive may be configured as a pressure sensitive adhesive. The member includes a channel including a first opening configured to receive a second adhesive. The second adhesive is a flowable or pumpable adhesive. The channel includes a second opening in fluid communication with the bonding surface. In a subsequent step and after adhering the member to the substrate with the first adhesive, the flowable adhesive is dispensed through the channel and into the gap such that the dispensed flowable adhesive is contained in the gap within the perimeter edge of the bonding surface. The flowable adhesive forms a bond between the substrate and the member. The first adhesive is configured to maintain the member in a predetermined position adhered to the substrate for at least the duration of time required to dispense the flowable adhesive into the gap and form the bond using the flowable adhesive.

The first adhesive may be configured to restrict the flow of the second adhesive on the bonding surface. The first adhesive may be configured as an adhesive tape or a plurality of adhesive elements. The second adhesive may be an acrylic-based adhesive, a urethane-based adhesive, or an epoxy-based adhesive. The second adhesive may be a reactive adhesive and/or may be characterized by a curing time such that the duration of time required to form the second adhesive bond includes the time required to cure the second adhesive. The process of adhering the member using the first adhesive, and dispensing the second adhesive through the adhered member to form the second adhesive bond may be automated. The method may further include applying the first adhesive to the member prior to adhering the member to the substrate, and this step may be automated.

The member may define a plurality of channels such that each respective channel of the plurality of channels has a first respective opening configured to receive the second adhesive, and each respective channel has a second respective opening in fluid communication with the bonding surface. The plurality of channels may be configured such that the plurality of second openings define a pattern with respect to the bonding surface, and may be configured to dispense the second adhesive into the gap such that the second adhesive is contained within a perimeter edge defining the bonding surface. The method may include dispensing the second adhesive concurrently through the plurality of channels.

The method may include preventing exposure of an interface surface defined by the member during dispensing of the flowable adhesive and/or of a contact area defined by the pressure sensitive adhesive to the flowable adhesive during dispensing of the adhesive, to prevent contamination of the interface surface and/or pressure sensitive adhesive contact area.

The above features and other features and advantages of the present invention are readily apparent from the following detailed description of the best modes for carrying out the invention when taken in connection with the accompanying drawings.

DETAILED DESCRIPTION

Figure 1:
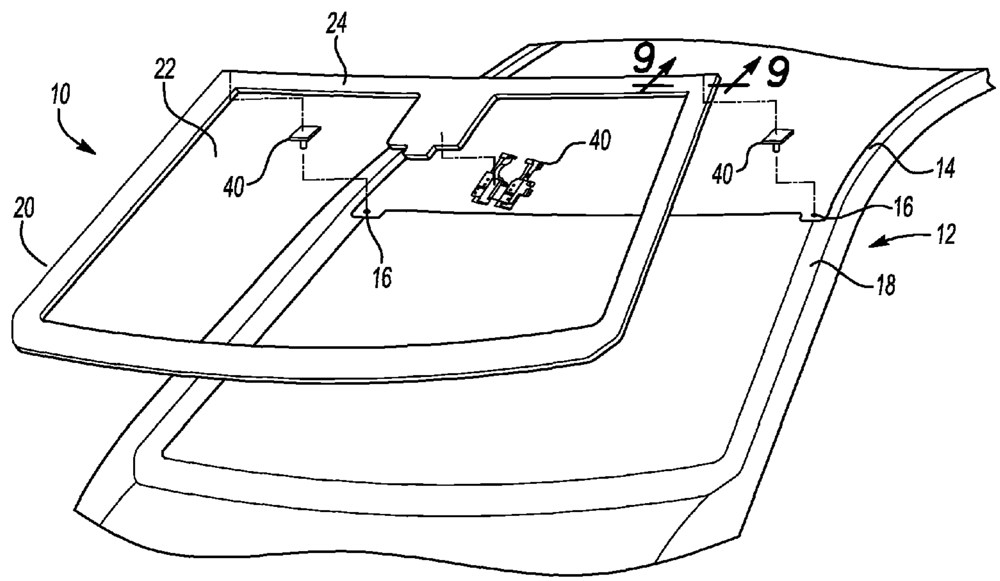
FIG. 1 is a partial schematic exploded perspective front view of a vehicle including a plurality of attachment members.

Referring to the drawings wherein like reference numbers represent like components throughout the several figures, the elements shown in FIGS. 1-9 are not necessarily to scale or proportion. Accordingly, the particular dimensions and applications provided in the drawings presented herein are not to be considered limiting. An attachment member including an integral adhesive channel and a method of adhering the attachment member to a substrate are provided herein. The attachment member, which may be referred to herein as the member, may be configured for use in an automobile, and the method may be used in the assembly of the vehicle. Referring to FIG. 1, shown is a partial schematic perspective front view of a vehicle generally indicated at 10 and including a plurality of attachment members 40 configured for attachment to a substrate defined by the vehicle 10, such as a glass panel 22 of a vehicle windshield 20.

Figure 2:
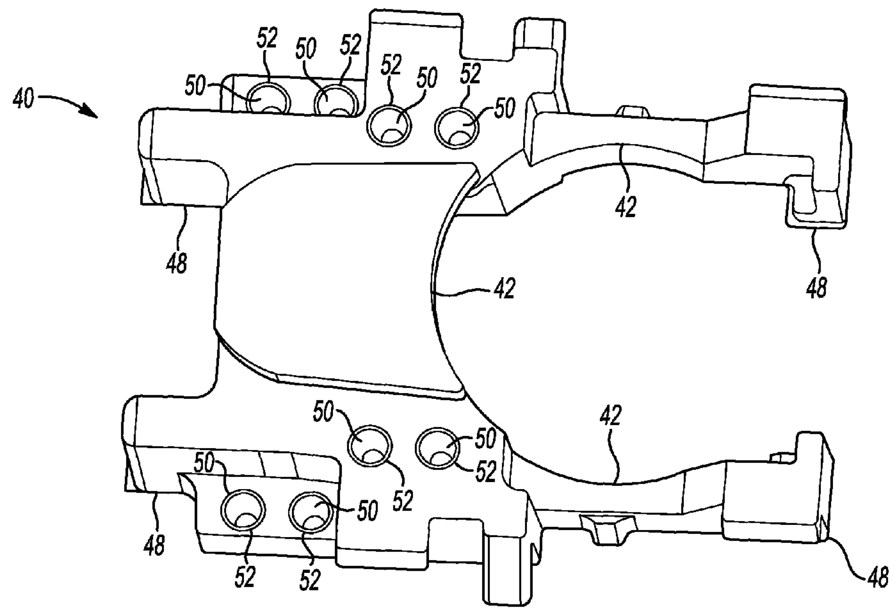
FIG. 2 is a schematic perspective top view of an attachment member of FIG. 1 in a first example configuration.
Figure 3:
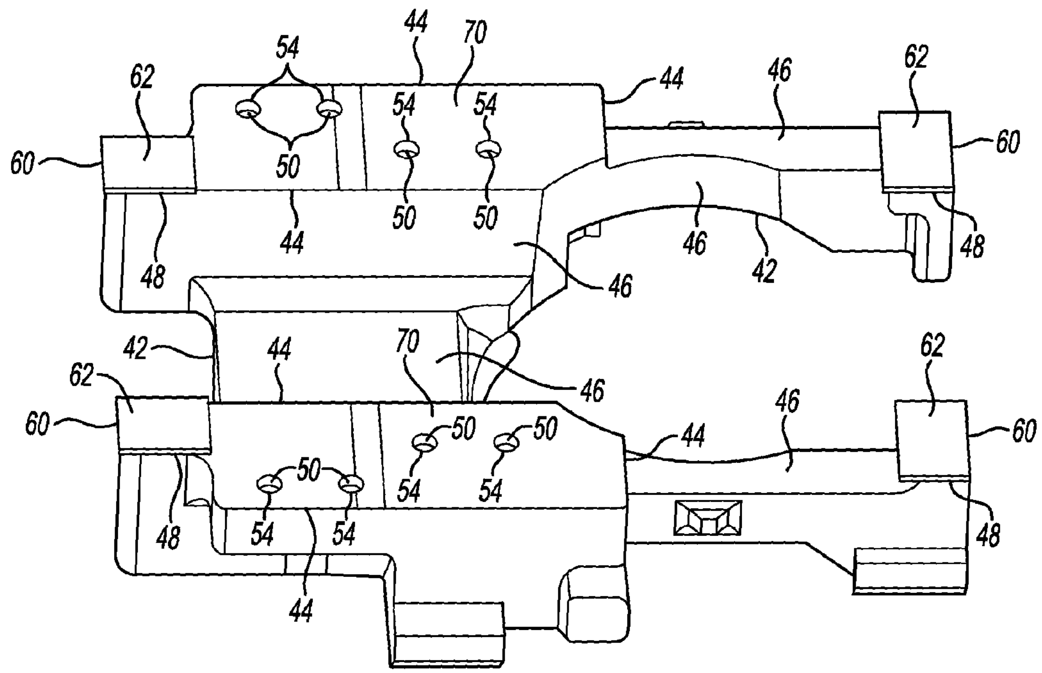
FIG. 3 is a schematic perspective bottom view of the attachment member of FIG. 2.
Figure 4:
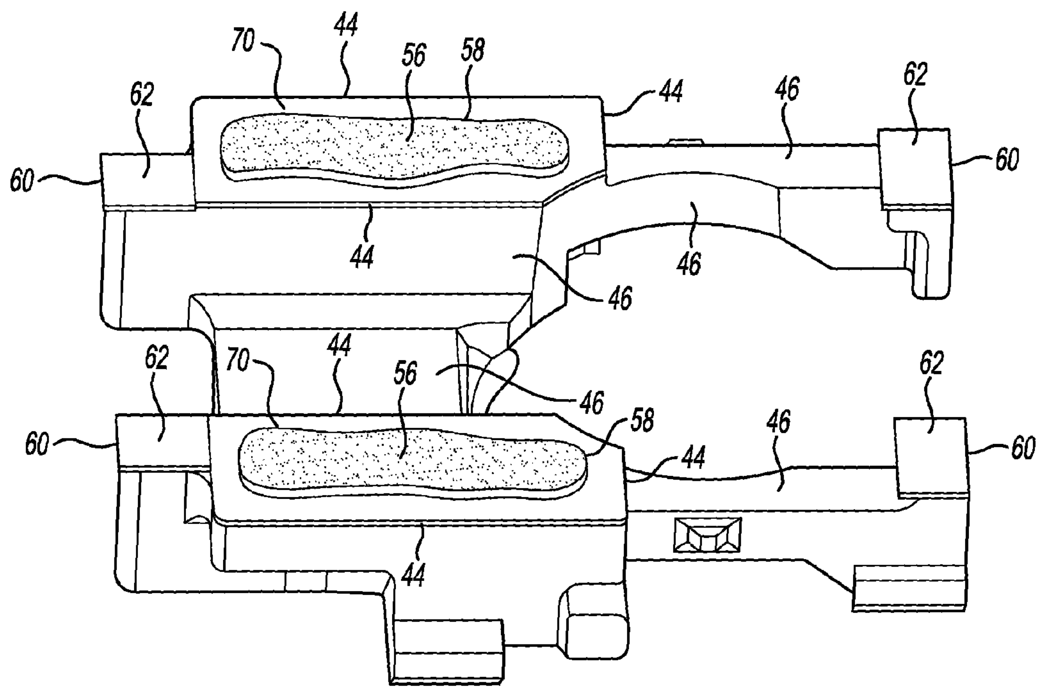
FIG. 4 is a schematic perspective bottom view of the attachment member of FIG. 2 after dispensing the flowable adhesive.

FIGS. 2-4 show, in a first example, an attachment member 40 configured as a multi-use bracket for attachment at a central portion of the windshield 20. The bracket member 40 may be configured to support or attach a mirror mount for the rear view mirror, wiring harness connectors, sensors, etc. The bracket member 40 may be of any suitable material, including metal-based and/or polymer-based materials. In one example, the bracket 40 may be a cast magnesium member. FIGS. 5-9 show, in a second example, an attachment member 40 configured as a glass locating pin for attachment at a plurality of predetermined locations on the windshield 20. The locating member 40 may include a pin body 42 (see FIG. 5) configured to interface with or be inserted into a receiving feature or opening 16 defined by the vehicle roof panel 14 and/or a portion 18 of a vehicle body 12, to locate the windshield 20 relative to the vehicle body 12. The pin member 40 may be of any suitable material, including metal-based and/or polymer-based materials. In one example, the pin member 40 may be a molded polymer member. The windshield 20 may include a tinted or obscured portion 24, which may be tinted to act as a sun shade and/or to conceal the members 40 attached to the windshield 20 for vehicle exterior aesthetic or appearance purposes.

Each of the members 40 may be attached to the substrate 22 using a multi-step method. In a first step of the method, referring to FIGS. 2-4 for a first example and FIGS. 4-9 for a second example, the member 40 is adhered to the substrate 22 using a first adhesive 60, which may be a pressure sensitive adhesive attached to a mounting surface 48 of the member 40, to define a gap 30 (see FIG. 9) between a bonding surface 70 of the member 40 and the substrate 22. In a subsequent step, a second adhesive 58, which is a flowable adhesive, is introduced to the gap 30 through at least one integral channel 50 defined by the member 40 and is distributed in the gap 30 and in contact with the bonding surface 70 and the substrate 22 to bond the member 40 to the substrate 22. Dispensing the second adhesive 58 into the gap 30 through the integral channel(s) 50 controls distribution of the second adhesive 58 such that squeeze out of the second adhesive 58 beyond a perimeter edge 44 defined by the bonding surface 70 is prevented. In the example shown in FIGS. 5-9, the first adhesive 60 may be configured to restrict the flow of the second adhesive 58, by providing a restricting surface or feature 64.

Advantages of the method and the member 40 configured with an integral adhesive channel 50 include using the first adhesive 60 to attach the member 40 to the substrate 22 in a predetermined location, wherein the first adhesive 60 is sufficiently strong to retain the member 40 in the predetermined location during dispensing of the second adhesive 58 and such that the member 40 exerts a pressure on the second adhesive 58 against the substrate 22 as the second adhesive 58 is distributed in the gap 30 forming a bond between the member 40 and the substrate 22. The first adhesive 60 obviates the need for supplement fixturing or clamping of the member 40 to the substrate 22 during application and curing of the second adhesive 58. The member 40 is configured to restrict the distribution of the second adhesive 58 within the perimeter edge 44 of the bonding surface 70 of the member 40, thereby eliminating squeeze out of the second adhesive 58, preventing contamination of non-bonded surfaces 46 by the second adhesive 58, and eliminating the need for secondary operations to remove or clean excessive flowable adhesive 58. Preventing contamination of non-bonded surfaces 46 may be necessary to ensure the non-bonded surfaces 46 are sufficiently clean for assembly to other surfaces, for example, insertion of the locating pin 40 of FIG. 5 into the vehicle opening 16, or assembly and connection of other components, such as sensors and wiring, to the multi-use bracket 40 of FIG. 2.

By not dispensing the second adhesive 58 until after the member 40 is adhered to the substrate 22, e.g., until after the adhesive contact areas 62 defined by the first adhesive 60 are in adhesive contact with the substrate 22 and the member 40, the first adhesive 60 is not subject to contamination by the second adhesive 58, and the adhesive properties of the first adhesive 60 are therefore not compromised by contamination. The first adhesive 60 retains the member 40 in a predetermined location during dispensing and curing of the second adhesive 58, such that pressure exerted by the dispensed adhesive 58 as it flows into the gap 30 and against the bonding surface 70 does not affect the location of the member 40 with respect to the substrate 22. By retaining the member 40 to the substrate 22 with the first adhesive 60, slippage or movement of the second adhesive 58 or member 40 during curing of the second adhesive 58 due to the weight of the member 40, gravity, etc., is prevented, facilitating accurate location of the member 40 with respect to the substrate 22 and formation of a consistent bond by the second adhesive 58, e.g., absent of slipped adhesive or other bonding inconsistencies which may decrease bond integrity or strength. The first adhesive 60 and second adhesive 58 may provide redundant means of retaining the member 40 to the substrate 22, such that one of the adhesives 58, 60 may provide a back-up retention method for the other adhesive, thereby increasing reliability of the adhesive joint formed therefrom. The size of the mounting surface 48 and the size of the bonding surface 70 required to retain the member 40 to the substrate 22 may be decreased due to the increased integrity and accuracy of bonding using the method described herein and the combination of adhesives 58, 60, decreasing the footprint of the attaching surfaces of the member 40, which may also decrease the size, weight and/or cost of the member 40.

Improved control of the placement and retention of the member 40 relative to the substrate 22 using the multiple step method including the two adhesives 58, 60 described herein results in precise and accurate locating of the member 40 in the vehicle. In the example shown in FIG. 1, improved precision and accuracy in the placement and location of the members 40, elimination of unsightly adhesive squeeze out, and a smaller bonding surface footprint may facilitate reduction in the size of the shaded area 24 needed to conceal the attachment surface of the member 40. Reduction of the shaded area 24 may increase the day light opening of the windshield 20, providing an additional advantage to the design and appearance of the vehicle 10.

Referring again to FIGS. 2-4, in a first example the attachment member 40 is configured as a multi-use bracket which may be attached to the central portion of the windshield 20, as shown in FIG. 1. The bracket member 40 includes a body 42 defining one or more interface surfaces 46 which may be configured to interface with the other vehicle components (not shown) connected by or attached to the bracket member 40. For example, the body 42 may be configured to support or house one or more vehicle components such as a mirror mount for the vehicle rear view mirror, wiring harness connectors, sensors, etc. which may interface with or be connected to the interface surfaces 46. The interface surfaces 46 may be required to be substantially free of contamination for proper assembly of the interfacing vehicle components.

Figures 5, 6, 7, 8:
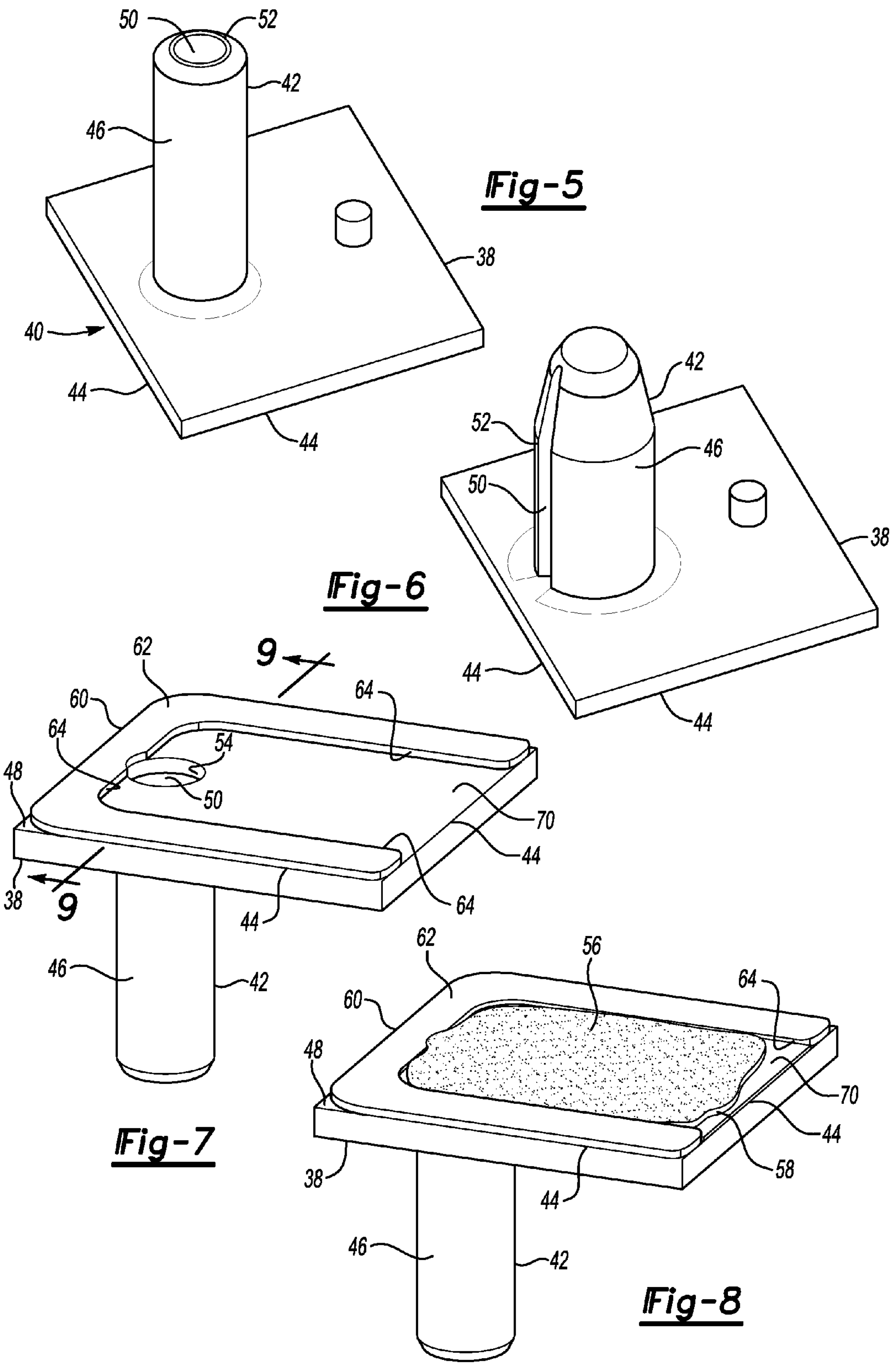
FIG. 5 is a schematic perspective top view of an attachment member of FIG. 1 in a second example configuration.
FIG. 6 is a schematic perspective top view of the attachment member of FIG. 1 in a third example configuration.
FIG. 7 is a schematic perspective bottom view of the attachment member of FIG. 6.
FIG. 8 is a schematic perspective bottom view of the attachment member of FIG. 6 after dispensing the flowable adhesive.
Figure 9:
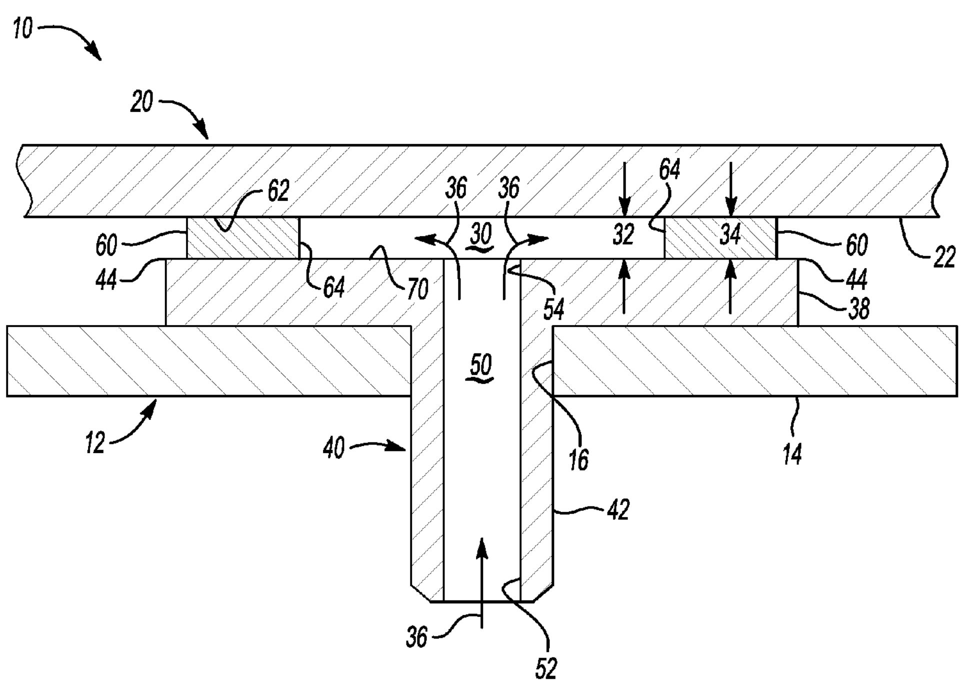
FIG. 9 is a schematic partial cross-sectional view of section 9-9 of the attachment member of FIG. 7 in the installed position indicated in FIG. 1.

FIGS. 7-9 show, in a second example, the attachment member 40 configured as a glass locating pin. One or more pin members 40 may be attached to the substrate 22 and used to locate and/or attach the windshield 20 to the vehicle body 12. The pin member 40 includes a pin body 42 and pin base 38. The pin body 42 defines the adhesive channel 50, and an interface surface 46 which may be configured to interface with an opening 16 defined by the vehicle body 12. The opening 16 may be defined by one or more members of the vehicle body, which may include a roof panel 14 and/or a body member 18. The interface surface 46 may be required to be substantially free of contamination for unhindered insertion and proper assembly of the pin member 40 to the opening 16 to accurately locate the windshield 20 relative to the vehicle body 12.

Referring to FIGS. 2-9, the member 40 may define one or more mounting surfaces 48 to which the first adhesive 60 is applied. The first adhesive 60 may be a pressure sensitive adhesive, and may be configured as an adhesive tape. The first adhesive 60 may be provided as an adhesive element for attachment to the member 40. The first adhesive 60 may be configured as an adhesive tape element having a contact area 62. The adhesive tape element 60 may be a two sided adhesive tape, such that the first adhesive 60 may first be applied to the mounting surface 48 prior to attaching the member 40 to the substrate 22. In the example shown in FIGS. 2-4, a plurality of adhesive tape elements 60 are applied to a respective plurality of mounting surfaces 48 configured to attach the bracket member 40 to the substrate 22. In the example shown in FIGS. 7-9, the first adhesive 60 may be configured as a tape element defining a restricting surface 64, to restrict the flow or wet out of the second adhesive 58 on the bonding surface 70 and/or to at least partially define the contact area 56 of the second adhesive 58. As shown in FIG. 7, the first adhesive 60 is adhered to a mounting surface 48 defined by a base portion 38 of the pin bracket 40. The mounting surface 48 is defined by a perimeter edge 44 and includes the bonding surface 70.

As shown in FIG. 9, the first adhesive 60 may be configured and/or applied to the member 40 to define a dimension 34, such that the dimension 34 determines a dimension 32 defining the gap 30. In the example shown, the first adhesive 60 may be a pressure sensitive adhesive tape having a thickness 34, such that when the member 40 is adhered to the substrate 22 using the second adhesive 60, the gap 30 between the bonding surface 70 and the substrate 22 has a clearance opening defined by the dimension 32. The clearance dimension 32 may define the thickness of the second adhesive 58 dispensed into the gap 30 through an adhesive channel 50 along the flow path 36.

The body 42 of the bracket member 40 may define one or more integral adhesive channels 50. Each of the adhesive channels 50 includes a first end 52 and a second end 54 in fluid communication with the channel 50. The first end 52 is configured to receive the second adhesive 58. The second end 54 is in fluid communication with a bonding surface 70 defined by the member 40, such that the second adhesive 58 may be dispensed into the first end 52 and through the channel 50 to flow out of the second end 54 onto the bonding surface 70. When the member 40 is attached to the substrate 22, as shown in FIG. 9, the second adhesive 58 flows into the gap 30 defined by the bonding surface 70 and the substrate 22 along a flow path 36 (see FIG. 9) to define a contact area 56 with the substrate 22, as shown in FIGS. 4 and 8. For purposes of illustration, the substrate 22 is not shown in FIGS. 4 and 8 but is understood to be adhered to the member 40. The bonding area 70 is defined by a perimeter edge 44. The second adhesive 58 is dispensed into the gap 30 such that a contact area 56 is formed by the second adhesive 58, and the second adhesive 58 and the contact area 56 are contained within the perimeter edge 44. The perimeter edge 44 partially or fully surrounds the bonding surface 70 to define a preferred boundary or footprint for the contact area 56, such that second adhesive 58 extending beyond the perimeter edge 44 would be considered squeezed out, or "squeeze out", as that term is commonly understood. Squeeze out is generally considered undesirable and preferably should be avoided, as it may be detrimental to appearance, may migrate to other areas or surfaces of the member 40 or substrate 22 to contaminate these areas or surfaces, and may require removal by secondary operations.

The second adhesive 58 may be a flowable or pumpable adhesive, which may be an acrylic-based adhesive, a urethane-based adhesive, an epoxy-based adhesive or other reactive adhesive characterized by a curing cycle required to form the second adhesive bond. The first adhesive 60 adheres the member 40 to the substrate 22 during the dispensing and curing cycle of the second adhesive 58, to contain the second adhesive 58 in contact with the bonding surface 70 and the substrate 22 to allow curing of the second adhesive 58 without movement of the second adhesive 58 during the curing cycle. Adhering the member 40 to the substrate 22 using the first adhesive 60 obviates the need to hold the member 40 in contact with the substrate 22 with a second fixture, which may delay further processing and/or assembly of the substrate 22 and/or the vehicle 10. By preventing movement of the second adhesive 58 during the curing cycle, slippage or shearing of the second adhesive 58 may be prevented to increase consistency and integrity of the bond formed by the second adhesive 58.

The duration of the curing cycle, e.g., the curing time, of the second adhesive 58, and the characteristics of the bond formed by the second adhesive 58 may vary with temperature. For example, the curing time may be shorter when the temperature of the second adhesive 58 and/or the member 40 and substrate 22 is elevated, e.g., above an ambient temperature during curing of the second adhesive 58, as for autoclaving. Curing the second adhesive 58 at an elevated temperature may result in higher residual stresses in the bond, which may be detrimental to bond integrity over time. Ambient temperature, as that term is used herein, may be room temperature or other temperature lower than an elevated temperature, and may be the temperature of the member 40 and substrate 22 at the time the second adhesive 58 is dispensed through the integral channel 50 onto the bonding surface 70 and substrate 22. The curing time at ambient temperature may be longer at ambient temperature than at an elevated temperature, however may result in lower residual stresses in the bond, which may be advantageous to bond integrity and reliability. Curing at an ambient temperature does not require heating the second adhesive 58, member 40 and substrate 22 to an elevated temperature, nor the energy, transportation, processing delay, etc. which may be associated with elevated temperature curing processes such as autoclaving. Adhering the member 40 to the substrate 22 using the first adhesive 60 facilitates curing of the second adhesive 58 at ambient temperature.

The second adhesive 58 may be provided to the adhesive channel 50 by a dispenser (not shown) configured to pump the flowable adhesive 58, wherein the dispenser may be configured to fluidly connect to the first end 52 of the channel 50. The dispenser may be configured to dispense a predetermined amount of the second adhesive 58, wherein the predetermined amount may be predetermined by weight, volume, pressure, or a combination of these or other factors which may be used to control the amount of second adhesive 58 dispensed through the channel(s) 50 defined by the member 40. The dispenser may be configured to concurrently dispense the adhesive 58 through a plurality of channels 50, where the plurality of channels 50 may be arranged in a pattern to produce a second adhesive contact area 56. For example, the dispenser may include a plurality of nozzles (not shown) arranged for concurrent fluid connection with the plurality of channels 50 shown in FIG. 2, such that the second adhesive 58 may be dispensed through the plurality of channels 50, and the contact pattern 56 shown in FIG. 4 may be formed. The dispenser may be configured to dispense the adhesive 58 in a sequence and/or with variable pressures and/or in varying amounts through each of the plurality of channels 50 to form the contact area 56 shown in FIG. 4.

In a non-limiting example, the adhesive channel 50 may be generally cylindrical, and the first and second openings may be generally round, as shown in FIGS. 2, 3, 5 and 7. In another example shown in FIG. 6, the first opening 52 may be generally configured as a slot. The examples shown are intended to be non-limiting. For example, the adhesive channel 50 may be non-cylindrical, tapered, non-linear, etc., as required to provide an adhesive flow path 36 from a surface of the member 40 including the first opening 52 to the bonding surface 70 including the second opening 54. A member 40 including a plurality of channels 50 may include one or more channels 50 which are sized and/or configured differently than another of the plurality of channels 50, as may be required by the configuration of the member 40, the bonding surface 70, and/or the contact area 56 required to bond the member 40 to the substrate 22.

The member 40 may be attached to the substrate 22 using a method which includes, in a first step, adhering the member 40 to the substrate 22 using the first adhesive 60 attached to the member 40 to form a gap 30 (see FIG. 9) between the substrate 22 and the bonding surface 70 of the member 40, wherein the bonding surface 70 is defined by a perimeter edge 44. The first adhesive 60 may be configured as a pressure sensitive adhesive. The first adhesive 60 may be configured to define a dimension 34, which may correspond to or define the thickness of the adhesive 58 dispensed into the gap 30, by determining a dimension 32 of the gap 30.

In a subsequent step, e.g., after adhering the member 40 to the substrate 22 using the first adhesive 60, the second adhesive 58, which is a flowable or pumpable adhesive, is dispensed through at least one channel 50 defined by the member 40 and configured as described herein, such that the second adhesive 58 flows along a flow path 36 through the channel 50 and into the gap 30. The dispensed second adhesive 58 flows into and is distributed in the gap 30 in contact with the bonding surface 70 and the substrate 22 to form the contact area 56 therebetween. The dispensed second adhesive 58 and contact area 56 is contained in the gap 30 within the perimeter edge 44 of the bonding surface 70. By containing the second adhesive 58 within the perimeter edge 44, squeeze out of the second adhesive 58 beyond the perimeter edge 44 and contamination is prevented. The second adhesive 58 forms a bond between the substrate 22 and the member 40. For the duration of time required for the second adhesive 58 to form the bond, which may include a minimum cure time, the first adhesive 60 maintains the member 40 in a predetermined position adhered to the substrate 22.

The first adhesive 60 may be configured, as shown in FIGS. 7-9, to restrict the flow of the second adhesive 58 on the bonding surface 70. The mounting surface 48 includes the bonding surface 70, each of which is defined by the same perimeter edge 44 in the present example. The first adhesive 60 defines a restricting surface 64, shown in FIGS. 7-9, configured to restrict the flow of the second adhesive 58 within the gap 30, wherein the gap 30 is partially defined by the restricting surface 64. The first adhesive 60 may be configured, as shown in FIGS. 7-8, to direct any squeeze out of the second adhesive 58 which may occur through a predetermined outlet, which in the example shown would be in the direction of the portion of the perimeter edge 44 not restricted by the first adhesive 60. The predetermined outlet may be located near or in a portion of the member 40 which is not critical to appearance, or not sensitive to contamination by the second adhesive 58. The predetermined outlet may be positioned with respect to one of the member 40 and the substrate 22 such that any squeeze out exiting the predetermined outlet is directed to a non-critical location on one of the member 40 and the substrate 22, or to a location concealing the squeezed out adhesive 58 or facilitating ready removal of the squeezed out adhesive 58.

The process of adhering the member 40 using the first adhesive 60 and dispensing the second adhesive 58 through the adhered member 40 to form the second adhesive 58 bond may be automated. For example, the automated process may include positioning the member 40 including the first adhesive 60 in a predetermined location relative to the substrate 22, and applying pressure to the member 40 in contact with the substrate 22 at the predetermined location to activate the pressure sensitive first adhesive 60 thereby adhering the member 40 to the substrate 22. In a next automated step, a dispenser may be fluidly connected to the adhesive channel(s) 50 to dispense the second adhesive 58 through the member 40 into the gap 30 such that the dispensed second adhesive 58 is contained within the bonding surface 70. The second adhesive 58 cures to form a bond between the member 40 and the substrate 22, as described previously, and without additional fixturing or processing.

The method may further include applying the first adhesive 60 to the mounting surface(s) 48 of the member 40 prior to adhering the member 40 to the substrate 22, and this step may be automated. The dispenser and/or the channel 50 may be configured such that when the second adhesive 58 is dispensed through the channel 50, any surplus second adhesive 58 is contained within the channel 50. Surplus second adhesive 58 may include, for example, second adhesive 58 which is residual in the channel after removal of the dispenser from the member 40, or may include second adhesive 58 which is displaced into the channel 50 during the curing process and/or from thermal or other expansion of the adhesive 58 in the gap 30.

The examples shown in FIGS. 1-9 of a glass locating pin and a bracket attached to a glass panel are not intended to be limiting. Other configurations of the member 40 and the substrate 22 are possible, including other attachable vehicle components such as brackets, trim, fascias, connectors, etc. configurable as the member 40 including at least one integral adhesive channel 50, and other vehicle components including body panels, door panels, trim panels, fascias, etc. defining a substrate 22 may be attached using the method described herein. The substrate 22 may be made from a glass, polymer, organic, or metal material, or a combination of these. The term vehicle, as used herein, is not limited to an automobile and includes vehicles encompassed by the automotive, truck, rail, mass-transit, marine, aviation, aerospace, off-road, recreational, etc. industries. Non-vehicle member 40 configurations are possible, for example, brackets and/or other components attachable to substrates 22 defined by glass panels, wall panels, etc. used in the fabrication of buildings and building interiors or other structural items.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method comprising:

adhering a pressure sensitive adhesive to an attachment member and a substrate to form:

a first bond between the member and the substrate; and a gap between the member and the substrate;

wherein the member includes:

a bonding surface defined by a perimeter edge, and a channel in fluid communication with the bonding surface;

wherein the member is configured as one of a locating pin and a bracket;

wherein the gap is defined by the pressure sensitive adhesive;

dispensing a flowable adhesive through the channel and into the gap subsequent to forming the first bond and such that flowable adhesive:

is contained in the gap within the perimeter edge of the bonding surface;

and forms a second bond between the substrate and the bonding surface of the member.

2. The method of claim 1, wherein the pressure sensitive adhesive is configured to:

retain the member at a predetermined location on the substrate; and maintain the member in the predetermined location through the duration of dispensing of the flowable adhesive and forming the second bond.

3. The method of claim 1, further comprising:

dispensing the flowable adhesive through a plurality of channels defined by the member, wherein:

each respective channel of the plurality of channels has a respective first opening and a respective second opening in fluid communication with the respective channel;

the respective first opening is configured to receive the flowable adhesive; and the respective second opening is in fluid communication with the bonding surface;

such that the flowable adhesive dispensed through the plurality of channels is contained within the perimeter edge of the bonding surface.

4. The method of claim 3, wherein the flowable adhesive is dispensed concurrently through the plurality of channels.

5. The method of claim 1, further comprising:

applying the pressure sensitive adhesive to the member prior to adhering the member to the substrate.

6. The method of claim 1, wherein adhering the member to the substrate with the pressure sensitive adhesive and dispensing the flowable adhesive is automated.

7. The method of claim 1, wherein:

the pressure sensitive adhesive is configured to restrict the flow of the flowable adhesive relative to the perimeter edge.

8. The method of claim 1, wherein the substrate is configured as a glass panel.

9. A method of assembling a vehicle, the method comprising:

providing a substrate defined by a first vehicle component;

providing an attachment member configured as a second vehicle component, the member including:

a bonding surface defined by a perimeter edge;

a pressure sensitive adhesive attached to the member and configured to adhere the member to the substrate;

a channel defined by the member and having a first opening and a second opening in fluid communication with the channel, wherein the first opening is configured to receive a flowable adhesive, and the second opening is in fluid communication with the bonding surface;

wherein the member is configured as one of a locating pin and a bracket;

adhering the member to the substrate in a predetermined location using the pressure sensitive adhesive attached to the member;

forming a gap between the bonding surface and the substrate by adhering the member to the substrate with the pressure sensitive adhesive;

wherein the gap is defined by the pressure sensitive adhesive;

dispensing the flowable adhesive through the channel and into the gap subsequent to adhering the member to the substrate with the pressure sensitive adhesive;

containing the dispensed flowable adhesive in the gap within the perimeter edge of the bonding surface, wherein for the duration of a curing cycle defined by the flowable adhesive:

the member is retained in the predetermined location; and the flowable adhesive is contained in contact with the substrate and the bonding surface; and forming a bond between the substrate and the member using the second adhesive.

10. The method of claim 9, wherein dispensing and containing the flowable adhesive further includes: preventing contamination by the flowable adhesive of at least one of an interface surface defined by the member, and a contact area defined by the pressure sensitive adhesive.

11. The method of claim 9, wherein the substrate is defined by a window of the vehicle.

* * * * *